Jan. 10, 1956  W. M. HARWEDEL  2,730,469
METHOD OF CLEANING MILKING MACHINE TEAT CUPS
Filed Dec. 13, 1949
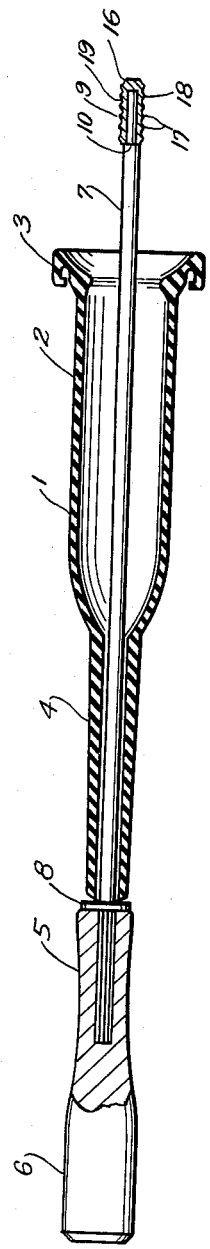
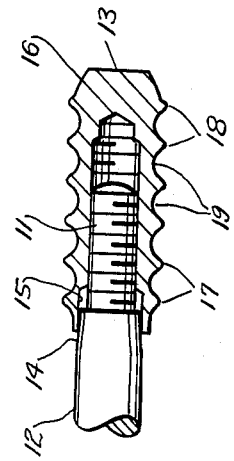
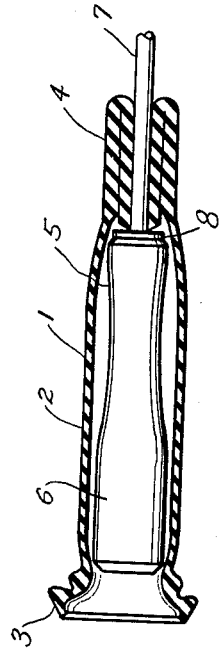
INVENTOR.
WALTER M. HARWEDEL
BY Oberlin & Limbach

United States Patent Office 2,730,469
Patented Jan. 10, 1956

2,730,469
METHOD OF CLEANING MILKING MACHINE TEAT CUPS

Walter M. Harwedel, North Ridgeville, Ohio

Application December 13, 1949, Serial No. 132,760

3 Claims. (Cl. 134—8)

The present invention relates generally as indicated to a cleaning method and more particularly to certain improvements in a method for cleaning the interior of milking machine inflations or teat cups.

Hitherto difficulty has been encountered in keeping the interior of the inflations or teat cups clean of butter fat, bacteria, and other undesirable accumulations by reason of the peculiar shape thereof which renders the same more or less inaccessible for cleaning and inspection purposes. Teat cups now in general use are formed from rubber or rubber-like material and include an elastic teat-receiving portion of tubular form and a contiguous elongated integral milk tube portion of much smaller diameter. For example, one common form of teat cup includes a teat-receiving portion roughly of 1¼" inside diameter and 5" length and a milk tube portion roughly of 5/16" inside diameter and 4" length.

One present practice is to cleanse the interior surfaces of the teat cup as with brushes which are adapted to be inserted thereinto and reciprocated and rotated therein but this practice has proved to be unsatisfactory because the brushes themselves are extremely difficult to keep clean inasmuch as each bristle and the twisted wire core, for example, pick up butter fat, bacteria and other impurities and further because the bristles of the brushes soon wear down and become soft so as not to be able to perform the cleaning task in a satisfactory manner. Moreover, after the cleaning operation has been performed, inspection of the interior surfaces is not readily possible whereby unseen accumulation may contaminate and ruin the milk subsequently passed therethrough.

The present invention is concerned with and has for one of its main objects the provision of a teat cup cleaning method by means of which thorough cleaning of at least the teat-receiving portion is effected while the interior surface thereof is exposed, this further enabling ready inspection.

Another object is to provide a method utilizing a cleaning device or tool which is adapted to expand and scrape accumulations from within the milk tube portion of the teat cup.

Another object is to provide a method utilizing a cleaning tool on which a teat cup is adapted to be at least in part turned inside-out to thus expose the interior surfaces of the entire teat receiving portion and if desired a portion of the milk tube portion.

Another object is to provide a new method of cleaning teat cups which involves expansion and scraping of the milk tube portion throughout its length and a turning inside-out of a portion of the milk tube if desired and the entire teat-receiving portion whereby such interior surfaces then on the outside and exposed may be thoroughly scrubbed and inspected.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevation view partly in cross-section of one form of device as inserted through a teat cup to cleanse the milk tube portion thereof;

Fig. 2 is a view similar to Fig. 1 except that the teat cup has been turned inside-out on the device to thus expose the interior surface of the teat-receiving portion and a portion of the milk tube of the teat cup; and Fig. 3 is a cross-section view on an enlarged scale showing an alternate means of attaching the milk tube cleansing element to the tool shank.

Referring now more specifically to the drawing, the rubber inflation or teat cup is represented by the numeral 1 and, as shown, comprises a teat-receiving portion 2 including a collar 3 and an integral elongated milk tube portion 4 contiguous with and coaxial with the portion 2. As previously indicated and as can now more clearly be seen, the peculiar shape of said cup 1 renders the interior more or less inaccessible for cleaning and inspection.

The cleaning device or tool 5 as shown includes a handle 6 of any desired material having fixedly secured therein by any suitable and well known expedient an elongated shank or rod 7 preferably of stainless steel or like non-corrosive material and of diameter slightly less than the inside diameter of the milk tube portion 4 of teat cup 1. Said rod 7 has affixed thereto as by press-fitting, welding, brazing, or other expedient, but preferably the first-named expedient, a collar or abutment 8 also of stainless steel or like non-corrosive material and spaced away from the end of the rod so as to bear against the end of handle 6. Said rod 7 also has a cleaning element 9 affixed at the other end thereof also preferably press-fitted onto said rod 7 and made of like non-corrosive material. Said cleaning element 9 abuts a shoulder 10 formed adjacent the end of said rod 7 whereby to avoid any crevices or spaces wherein butter fat, bacteria, or other impurities may accumulate and be difficult to remove. In lieu of a press-fit it is herein proposed to include a threaded connection 11 between said rod (labeled 12 in Fig. 3) and said element (labeled 13 in Fig. 3) wherein said rod is provided with a slightly tapered seat 14 and said element is formed with a counterbore 15 which is adapted to seat tightly against such tapered seat 14 by a wedging action and thereby provide the necessary seal against ingress and accumulation of impurities.

It is to be understood that either or both the collar 8 and the element 9 or 13 may be integrally formed on said rod 7 or 12 by machining or swaging operations but for sake of economy of manufacture said collar and element are made separate of the rod and secured thereon in any of the ways indicated.

Said cleaning elements 9 and 13 are each of a diameter somewhat larger than the inside diameter of the milk tube portion 4 and as best shown in Fig. 3 comprises a rounded end portion 16 facilitating entrance thereof into the milk tube portion 4 of the teat cup 1 and a series of ribs 17 having narrow but smoothly rounded crests 18 to preclude cutting or abrading action in the milk tube portion 4 and relatively broad and well rounded roots or valleys 19 to enable ready removal of impurities or accumulations therefrom simply by swishing in a cleaning solution and wiping with a cloth or the like or by wiping off the accumulations with a wet cloth followed by drying.

To use the device described, the cleaning element 9 or 13 is first inserted into the milk tube end of the teat cup 1 and pushed longitudinally therethrough, the ribs 17 on said element operating to transversely stretch the milk tube portion 4 and to thus effectively remove all accumulations of butter fat, bacteria, or other impurities therein. It is to be noted that the rod 7 as well as rod 12 is of length such that the cleaning element 9 or 13 thereon extends beyond the end of the teat cup 1 whereby the impurities in the valleys 19 of said element may be readily cleaned therefrom.

Now with the end of the milk tube portion 4 abutting the collar 8 on said rod, endwise pressure applied on the teat-receiving portion 2 of the cup 1 will effect turning inside-out of such portion 2 along with any length of the milk tube portion 4 if desired whereby such interior surfaces, now on the outside and exposed, may be thoroughly scrubbed, cleaned, and sterilized and thus rendered completely free from butter fat, bacteria, and other impurities. Moreover, while the teat cup 1 is thus turned inside-out, the cleaned surfaces may be thoroughly inspected.

The loose fit of the milk tube portion over said rod 7 or 12 facilitates turning inside-out the portion of the length of the milk tube. Said rod further provides a support for said milk tube to preclude buckling during application of endwise pressure on the cup 1.

Next, the cleaned teat cup 1 is restored to its normal shape as in Fig. 1 and upon withdrawal of rod 7 (or rod 12) from therewithin the cleaning element 9 (or element 13) will perform a final cleaning operation of the milk tube portion 4. It has been found that the cleaning element 9 or 13 performs its cleaning function so well that the milk tube portion 4 need not be turned inside-out at all but it is nevertheless preferred out of an abundance of caution to turn most of it inside-out so that the same may be cleaned along with the teat-receiving portion 2. With respect to the short portion of the milk tube 4 which has been left unturned in Fig. 2, the same is visible for about 1½" of its length and may thus be readily inspected from the exterior without requiring turning inside-out.

Other modes of applying the principle of the invention may be employed, change being made as regards the details described, provided the features stated in any of the following claims, or the equivalent of such, be employed.

I therefore particularly point out and distinctly claim as my invention:

1. The method of cleaning a rubber teat cup of the type including teat-receiving and milk tube portions comprising transversely stretching the milk tube portion while removing accumulation of impurities from the interior thereof, and applying endwise pressure on the cup while the end of the milk tube portion engages an abutment and while the milk tube portion is supported from buckling to turn inside-out at least the teat-receiving portion to expose the interior thereof for cleaning and inspection.

2. The method of cleaning a rubber teat cup of the type including teat-receiving and milk tube portions comprising removing accumulations from the interior surface of the milk tube portion by axially inserting a rod-like implement having a cleaning surface through the milk tube portion, positioning the end of the milk tube portion against an abutment shoulder of the inserted implement, applying endwise pressure on the teat-receiving portion of the cup, while the end of the milk tube portion engages the abutment shoulder of the implement, and while the milk tube portion is supported against buckling by the inserted implement, to turn inside-out at least the teat-receiving portion to expose the interior surface thereof for cleaning and inspection, cleaning such exposed interior surface of the teat-receiving portion while the latter is thus turned inside-out, and again cleaning the interior surface of the milk tube portion by axially withdrawing the implement from therewithin.

3. The method of claim 2 wherein the teat-receiving portion, when thus turned inside-out, is internally supported by the handle of the inserted implement to facilitate thorough cleaning of such exposed surface of the teat-receiving portion.

References Cited in the file of this patent

UNITED STATES PATENTS

| 172,996 | Gregg | Feb. 1, 1876 |
| 322,644 | Robinson | July 21, 1885 |
| 616,696 | Cochran | Dec. 27, 1898 |
| 667,060 | Carr | Jan. 29, 1901 |
| 863,762 | Sheakley | Aug. 20, 1907 |
| 873,311 | Hakenholz | Dec. 10, 1907 |
| 1,382,587 | Withycombe | June 21, 1921 |
| 1,665,257 | Dake | Apr. 10, 1928 |
| 1,726,892 | Gollmar | Sept. 3, 1929 |
| 2,333,713 | Eiben | Nov. 9, 1943 |
| 2,429,581 | Maitlen | Oct. 21, 1947 |

FOREIGN PATENTS

| 11,751 | Great Britain | of 1896 |
| 352,274 | Great Britain | July 9, 1931 |